United States Patent Office 3,431,221
Patented Mar. 4, 1969

3,431,221
CATALYZED WURTZ-FITTIG SYNTHESIS
Erwin Hoess, Wharton, N.J., assignor to the United States of America as represented by the Secretary of the Army
No Drawing. Filed Jan. 26, 1965, Ser. No. 428,265
U.S. Cl. 260—2          4 Claims
Int. Cl. C08g 31/34; C07f 7/02

ABSTRACT OF THE DISCLOSURE

Processes for synthesizing heat-stable compounds such as polyolefins, polyphenylenes, silanes, or silarylenes, by Wurtz-Fittig type reactions, which employ active hydrogen or oxygen containing compounds, or radical formers with sodium metal, including malonic esters, ketones, acetoacetic ester, aliphatic ketones, cyclopentadiene, phthalimid, pyrrole, iodobenzene, and the like.

---

The invention described herein may be manufactured and used by or for the Government for governmental purposes without the payment to me of any royalty thereon.

This invention relates to Wurtz-Fittig syntheses catalyzed with compounds containing active hydrogen and/or oxygen. More particularly, the invention relates to such a catalyzed synthesis which is characterized by smooth and safe reactions and higher yields.

Polyphenylenes, silanes, and silarylenes, for example, have been rather extensively studied and investigated in recent years due to their high degree of thermal stability, thus making them very useful as base resins for thermally stable adhesive systems and the like.

Heretofore, polyphenylenes have been prepared by reacting aryl halides with metals, as in the Ullmann reaction:

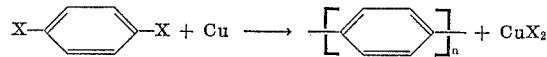

or the Wurtz-Fittig reaction:

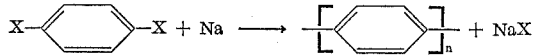

or the Grignard reaction:

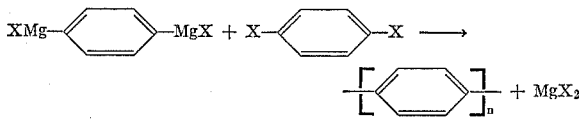

Polyphenylenes thus prepared have not been pure. Further, the reactant concentrations are maintained undesirably low for safety reasons and the reactions are time-consuming. Similarly, silanes and silarylenes, and the processes used in their syntheses, are characterized by infirmities generally described above.

It is therefore an object of this invention to synthesize compounds hereinabovementioned by catalyzed Wurtz-Fittig reactions.

Another object of this invention is to synthesize these compounds and others by improved Wurtz-Fittig syntheses which are characterized by generally high reactant concentrations, fast reaction times and improved yields.

Other and further objects of the invention will be apparent to those skilled in the art upon study of this disclosure.

According to one aspect of the present invention, my high temperature resistant compounds are efficiently synthesized by Wurtz-Fittig type reactions modified with active hydrogen or oxygen containing compounds or radical formers with sodium metal, such for example, as malonic esters, aliphatic ketones, such as acetone, methylethylketone, etc., acetoacetic ester, pyrrole, iodobenzene, cyclopentadiene, phthalimide, etc., all of which are applied in catalytic amounts only of a few percent of the substrate applied as opposed to reactions with pi complexes such as diphenyl or naphthalene, where considerably higher amounts of the complex former are necessary to achieve complete reaction of substrate. In the following specific examples illustrative thereof, it is not intended that the scope of the invention be limited thereto.

Example I

Into a (1) one liter 3-necked flask equipped with stirrer, reflux condenser, $N_2$ inlet and thermometer were placed 94 g. (0.4 M) p-dibromobenzene, 70 ml. of a mixture of 70% 1,4-dioxane dried over sodium wire (solvents such as ethers or diethers such as dioxane or glycol dimethylether may be used advantageously) and 30% of an aromatic hydrocarbon such as xylene (by volume) having a high boiling range so as to acieve a reflux temperature slightly above the melting point of the sodium metal, and 4 ml. of a mixture of equal amounts of methylethylketone and acetone. The temperature was raised to the reflux temperature (about 105° C.), a steady slow stream of $N_2$ being maintained throughout. Gradually 22 g. of Na metal were added, waiting after each addition until the vigorous reaction was over. When all of the Na was added the reaction was allowed to proceed under vigorous agitation for about 2 additional hours, the total reaction time being about 2 hours and 40 minutes. During the reaction, the color of the mixture became dark green. After completion, the reaction was cooled to 10° C. and was quenched into an excess of ice cold methyl alcohol (MeOH). At this point the color of the mixture changed to a deep yellow. The slurry thus obtained was filtered, washed with more MeOH and then washed separately with water. All the washings were collected and titrated for bromide ion. 55.35 g. of bromide were found which corresponds to 86% conversion of p-dibromobenzene. The product was dried in vacuo after thorough washing. 17 g. of a yellow powder were obtained (53.8% of theoretical). 10 g. of this powder were redissolved in chloroform, the chloroform solution filtered, and the powder precipitated with ice cold MeOH. The precipitate was collected, washed and dried. 7 g. were recovered. The MeOH insoluble product was dried at 0.5 mm. Hg for 5 hours and then elementally analyzed as follows: C, 76.78; H, 4.40; Br, 16.63; O, 2.05; molecular wt., 1640. The theoretical values for polyphenylene $(C_6H_4)_n$: C, 94.73%; H, 5.27%. The melting range of the product was between about 222°–230° C.

Example II 60 g. (0.4 M) of p-dichlorobenzene in 70 ml. of the dioxane-xylene solvent of Example I were subjected to the same reaction thereof with 22 g. of Na metal in the presence of the same catalysts. The color of the reaction before quenching was black. After quenching, the resultant slurry became bluish and pasty. After purification, 25.17 g. of Cl ion was found (88.7% conversion of p-dichlorobenzene). The crude yield was 9 g. (28.5% of theoretical) of a tan colored powder. The product was reprecipitated to give a product with a melting range of 305 to 325° C. and was elementally analyzed as follows: C, 83.86; H, 4.72; O, 3.47; Cl, 8.53; molecular wt., 2257.

Example III 63 g. of 4,4'-dibromobiphenyl (0.2 M) in 70 ml. of the dioxane-xylene solvent mixture were reacted under the conditions aforedescribed with 15 g. of Na metal and 5 ml. of diethyl malonate. The color of the mixture before quenching was turquoise and turned bright yellow upon quenching into ice cold MeOH. An overall conversion of 81% was obtained. 17 g. of light yellow powder (56% of theoretical) were recovered as yield, 10 g. of which were again subjected to purification by reprecipitation from $CHCl_3$ solution as before. The melting range was found to lie between about 215 to 227° C. and an elemental analysis is: C 86.26%; H 5.28; Br 7.39; O 1.41; molecular wt. 848.

Example IV 100 g. of 2,6-dichloronaphthalene (0.5 M) in 90 ml. of the dioxane-xylene solvent mixture were reacted under the conditions aforedescribed in Example I with 25 g. sodium metal and the same catalysts as mentioned under Example I. The color of the batch before quenching was black and its consistency became extremely tough. Therefore, another 150 ml. of xylene was added, after adding 20 more grams of sodium metal which resulted in a manageable batch. After 4 hours of reaction time the batch was quenched as described in the previous examples. An overall conversion of 90.5% was achieved and 35 g. (55.5% of theoretical) of a tan powder was obtained. The powder was again subjected to reprecipitation from a chloroform solution as before. Its melting range was found to lie between about 263 to 288° C. and an elemental analysis follows: C 87.35%; H 4.62%; resid. Cl 5.90%; molecular wt. 1225 (ca. 10 units of $C_{10}H_6$).

Example V 84 g. of 9,10-dibromoanthracene (0.25 M) were dissolved into 100 ml. of the dioxane-xylene mixture and subjected to the same reaction as above with 25 g. of sodium metal in the presence of 2 ml. each of acetone and MEK and reacted for 4 hours at 115 to 125° C. After quenching, the batch was washed with methanol and acetone to remove unchanged starting material. A conversion of 94% was achieved. 14.5 g. of a tan powder was obtained (33% of theoretical). After reprecipitation from chloroform, its melting range was determined to lie between about 248 to 305° C. The elemental analysis is: C 90.63%; H 5.61%; O 3.61%; molecular wt. 2015 (ca. 11 units of $C_{14}H_8$).

Example VI 150 g. of ortho-dichlorobenzene (1 M) were mixed with 200 ml. of the dioxane-xylene mixture and reacted for 4 hours with 50 g. of sodium metal in the presence of 2 ml. each of acetone and MEK catalysts. The sodium was added very slowly as the reaction was extremely vigorous. The batch color was black before quench and upon quenching turned bluish purple and finally tan. A 93.6% overall conversion was achieved and 30.5 g. (40.2% of theoretical) of a tan powder was recovered, which, after reprecipitation, had a melting range from about 140 to 155° C. The elemental analysis is: C 91.60%; H 5.32%; resid. Cl 1.11%.

Example VII 83 g. of tetrachlorethylene, $C_2Cl_4$ (0.5 M) were mixed with 100 ml. of the dioxane-xylene mixture and reacted with 50 g. of sodium metal in the presence of the aforementioned ketone catalysts at about 107 to 109° C. for 3 hours. The color of the batch before quenching changed from colorless to yellow to brown and finally to black. After quenching, the batch was worked up as usual but a cross-linked insoluble black powder (5 g., 42% of theoretical) was recovered as expected and the overall conversion was 59% polyolefin.

Example VIII

Preparation of dodecylphenylcyclohexasilane: 120 g. (0.4 M) of diphenyldichlorosilane and 1 ml. of diethyl malonate in 70 ml. dioxane-xylene (70/30) solvent were placed in a 1 liter 3-necked flask equipped with stirrer, reflux condenser, $N_2$ inlet and thermometer. The temperature of the mixture was raised to the reflux point (about 105° C.), a steady slow stream of nitrogen being maintained throughout. 22 g. of sodium was then added gradually, allowing time for the vigorous reaction to subside between the additions. After all the sodium was added the reaction mixture was blue-black to black in color. The reaction was allowed to proceed for three hours before quenching with cold methanol. After quenching the color turned to pale blue. The product obtained was filtered and washed with methanol yielding 30 g. of a yellow product (42.25% of theoretical yield). The product was purified by dissolving it in a sufficient quantity of chloroform and then reprecipitating with cold methanol. The melting range of the product was from about 87 to 98° C. and an elemental analysis for $(C_{12}H_{10}Si)_6$ is:

Theoretical: C 79.2%; H 5.48%; Si 15.40%; Cl 0%; O 0%; molecular wt. 1092. Found: C 77.52; H 5.63; Si 15.55; Cl trace; O 0; molecular wt. 1128.

Example IX

Copolymerization of (1 M) 1,2-dichlorobenzene with (½ M) 1,2,4-trichlorobenzene: 91 g. of 1,2,4-trichlorobenzene (0.5 M) and 150 g. (1 M) of orthodichlorobenzene were mixed with 100 ml. of the dioxane-xylene mixture and reacted with 105 g. of sodium metal in the presence of 2 ml. of diethyl malonate as a catalyst. The reaction was extremely vigorous and the sodium addition had to be done very cautiously. The color of the batch changed from purple to black before quenching to brown after quenching. After 1 hour of reaction time, additional xylene had to be added in order to keep the batch manageable. The batch was quenched after 5 hours of reaction time. Almost 100% conversion was achieved and 60 g. of a brown powder (53% of theoretical) were obtained which was completely soluble in chloroform, but did not completely melt below 350° C. (the beginning of the melting range was about 271° C.). When the same experiment was performed with p-dichlorobenzene instead of the ortho isomer, practically no yield was obtained, which seems to indicate the presence of sterical hindrance in this particular case to form the expected 8 membered ring from 2 units of ortho-phenylene and 1 unit of 1,2,4-$C_6H_3$ radical per repeating unit. The elemental analysis is: C 88.62%; H 5.30%; resid. Cl 1.48%; molecular wt. 2530 which corresponds to 11 repeating units of $C_{18}H_{11}$ or an average of 5.5 units of 8 membered ring systems.

Example X

Copolymerization of (½ M) dibromobiphenyl with (⅛ M) $C_2Cl_4$: 156 g. of 4,4'-dibromobiphenyl (0.5 M) and 21 g. (⅛ M) $C_2Cl_4$ were dissolved in 100 ml. of the dioxane-xylene mixture and reacted with 75 g. of sodium metal in the presence of 2 ml. each of acetone and MEK catalysts and 5 ml. of diethyl malonate. After an induction period of 15 minutes, a vigorous reaction was started when a small quantity of sodium was added to start the reaction. The color of the batch was radically different from that of Example III where dibromobiphenyl alone was reacted, being dark brown rather than turquoise. After the quench, the batch turned a bright yellow. A 94.5% conversion was achieved after 7 hours of reaction time at about 108 to 118° C. 49 g. (62% of theoretical) of a yellow powder was obtained having a melting range from 193 to 216° C. and the elemental analysis after reprecipitation from chloroform was: C 87.34%; H 5.66%; resid. Br 4.41%; molecular wt. 1370 (ca. 2 units of $C_{26}H_{16}$).

Example XI

Copolymerization of dichlorobenzene with diphenyldichlorosilane: equimolar quantities (0.2 M) of p-dichlorobenzene and diphenyldichlorosilane together with 1 ml. of diethylmalonate were reacted with sodium in the manner described in Example VIII. A yield of 36.5 g. of a tan colored powder was obtained (70% of theoretical yield). The melting range of this product was 134–189° C. and was elementary analyzed ($C_{18}H_{14}Si$).

Theoretical: C 83.80%; H 5.43%; Si 10.80%; Cl 0%; O 0%; molecular wt. ?. Found: C 80.60; H 5.49; Si 10.70; Cl 0.80; O 1.14; molecular wt. 2635 (10 units of $C_{18}H_{14}Si$).

Example XII

Copolymerization of 4,4'-dibromobiphenyl with diphenyldichlorosilane: A copolymer of 4,4'-dibromobiphenyl and diphenyldichlorosilane was prepared according to the procedure outlined in Example VIII. A bright yellow powder, melting range between about 162 to 205° C. was obtained. The yield was 77% of theoretical. The product was chloroform soluble and methanol insoluble and had a molecular weight of 1598. Elemental analysis for $C_{24}H_{18}Si$:

Theoretical: C, 86.30%; H, 5.46%; Si, 8.15%; Br, 0%; Cl, 0%; O, 0%; molecular wt. 0. Found: C, 83.01%; H, 5.50%; Si, 7.28%; Br, 2.58%; Cl, 0%; O, 0.51%; molecular wt., 1598 (Avg. 4.8 units $C_{24}H_{18}Si$).

Example XIII

Copolymerization of (½ M) diphenyldichlorosilane with (¼ M) $C_2Cl_4$: 127 g. (0.5 M) of $Ph_2SiCl_2$ and 43 g. of $C_2Cl_4$ (¼ M) were mixed with 100 ml. of the dioxane-xylene mixture and reacted with 50 g. of sodium metal in the presence of 5 g. of diethyl malonate. After the reaction was reasonably complete, it was quenched. 56 g. (57.7% of theortical) of a dark brown resin was recovered having a melting range between about 112 to 122° C. and an elemental analysis of: C, 77.73%; H, 5.85%; Si, 14.46%; molecular wt. 1160 (ca. 5.5 repeating units of $C_{14}H_{10}Si$).

Example XIV

Copolymerization (⅛ M) $SiCl_4$ with (½ M) orthodichlorobenzene: 75 g. of orthodichlorobenzene (0.5 M) (O) and 22 g. of $SiCl_4$ (0.125 M) were mixed with 150 ml. of the dioxane-xylene mixture and reacted with 45 g. of sodium metal in the presence of 5 ml. of phenyliodide as a catalyst. The color of the batch turned from dark green to black and after quenching, became a yellowish tan. A 96% conversion was observed and 20.5 g. of a light tan powder (49.5% of theoretical) was recovered. The melting range was found to be about 207 to 223° C. and an elemental analysis is: C, 83.67%; H, 5.34%; Si, 7.85%; No resid. Cl; molecular wt. 1455 (avg. 4.22 units of $C_{24}H_{16}Si$).

Example XV

Copolymerization of (¼ M) each of 1,4-dibromonaphthalene, $Ph_2SiCl_2$ and $BF_3$: 72 g. of 1,4-dibromonaphthalene, 63 g. of $Ph_2SiCl_2$ and 88 g. of 21.2% $BF_3$-dioxane complex (0.25 M each) were mixed with 50 ml. of the dioxane-xylene mixture and reacted under slow addition with 88 g. of a 50% sodium dispersion in xylene in the presence of 3 ml. of PhI as a catalyst at 105–110° C. under a nitrogen blanket for 6 hours. The batch became black at the start of the reaction and turned a bright yellow after quenching. 76 g. (95.2% of theoretical) of a fused brown resin were recovered after being worked, and the $CHCl_3$ solution had a very intense green fluorescence. Its melting range was found to lie between 119 to 135° C. An elemental analysis is: C, 82.27%; H, 5.59%; Si, 9.11%; B, 0.67%; molecular wt., 897.

Example XVI

Copolymerization of (¼ M) each of $Ph_2SiCl_2$, $PhSiCl_3$ and $SiCl_4$: 63 g. of $Ph_2SiCl_2$, 53 g. of $PhSiCl_3$ and 43 g. of $SiCl_4$ (0.25 M) each were mixed and ⅓ thereof mixed with 100 ml. of the dioxane-xylene mixture and the reaction started by slow addition of 110 g. of a 50% sodium metal dispersion in xylene in the presence of 5 ml. of diethyl malonite as a catalyst. The remaining ⅔ of the amount of the substrate mixture was gradually added along with the sodium dispersion to minimize losses of $SiCl_4$ due to its volatility at the reaction temperature even in a refluxed system. Total reaction time was 5½ hours at 107 to 110° C. The color of the batch before quench was greenish brown, the greenish tinge later fading, and its consistency was thin. After quenching and working, 79 g. (97% of theoretical) of a pale yellow resin was recovered. The melting range was found to lie between 141 to 162° C. and was only partially soluble in $CHCl_3$. An elemental analysis of the soluble part: C, 55.47%; H, 4.93%; Si, 19.51%; molecular wt. (soluble part), 2475.

It is apparent from the foregoing examples that I have provided thermally stable organic compounds useful in a variety of applications where resistance to high temperatures is essential. Further, these compounds are prepared by unique processes which are economical in that higher concentrations of reactants are permitted than heretofore possible, thus promoting higher yields in a shorter period of time.

I claim:
1. A process of synthesizing a copolymer of dihalobenzene and diphenyldihalosilane comprising the steps of
   mixing equimolar quantities of p-dichlorobenzene (0.2 M) and diphenyldichlorosilane (0.2 M) with about 1 ml. of diethylmalonate in about 70 ml. of 70% 1,4-dioxane and 30% xylene by volume to form a mixture,
   heating said mixture to its reflux point while maintaining a stream of nitrogen therearound.
   slowly adding about 22 g. sodium to said heated mixture in a period of about three hours,
   quenching the sodium-reacted mixture to form said copolymer.
2. A process for synthesizing a copolymer of dihalodiphenyl and diphenyldihalosilane comprising the steps of
   mixing about 60 g. each of 4.4'-dibromobiphenyl (0.2 M) and diphenyldichlorosilane (0.2 M) with about 1 ml. of diethylmalonate in about 70 ml. of 70% 1,4-dioxane and 30% xylene by volume to form a mixture,
   heating said mixture to its reflux point while maintaining a stream of nitrogen therearound,
   slowly adding about 22 g. sodium to said heated mixture in a period of about three hours,
   quenching the sodium-reacted mixture to form said copolymer.
3. A process for synthesizing a copolymer of silicon tetrachloride and orthodihalobenzene comprising the steps of
   mixing about 75 g. of orthodichlorobenzene (0.5 M) and 22 g. of silicontetrachloride (0.1/8 M) in about 150 ml. of 70% 1,4-dioxane and 30% xylene by volume to form a mixture,
   heating said mixture to its reflux point while maintaining a stream of nitrogen therearound,
   slowly adding about 45 g. sodium to said heated mixture in the presence of 5 ml. of phenyliodide, and
   quenching the sodium-reacted mixture to form said copolymer.
4. A process for synthesizing a copolymer of dihalo- naphthalene, diphenyldihalosilane and boron trifluoride comprising the steps of mixing about 72 g. of 1,4-dibromonaphthalene (0.25 M), 63 g. of diphenyldichlorosilane (0.25 M) and 88 g. of 21.2% boron trifluoride-dioxane complex (0.25 M each) in about 50 ml. of 70% 1,4-dioxane and 30% xylene by volume to form a mixture, heating said mixture to its reflux point while maintaining a stream of nitrogen therearound, slowly adding about 88 g. of a 50% sodium dispersion in xylene to said heated mixture in the presence of 3 ml. of phenyliodide at 105–110° C. for 6 hours under a nitrogen blanket, and quenching the sodium-reacted mixture to form said copolymer.

References Cited

UNITED STATES PATENTS 3,159,589  12/1964  Bloomfield et al. _____ 260—2

OTHER REFERENCES

Talmud: "Chemical Abstracts," vol. 33 (1939), col. 3753–4.

Domnin: "Chemical Abstracts," vol. 40 (1946), col. 1797.

SAMUEL H. BLECH, *Primary Examiner.*

U.S. Cl. X.R.

260—91.7, 448.2